United States Patent [19]

Kim

[11] Patent Number: 5,241,547
[45] Date of Patent: Aug. 31, 1993

[54] ENHANCED ERROR DETECTION SCHEME FOR INSTRUCTION ADDRESS SEQUENCING OF CONTROL STORE STRUCTURE

[75] Inventor: Dongsung R. Kim, Laguna Hills, Calif.

[73] Assignee: Unisys Corporation, Blue Bell, Pa.

[21] Appl. No.: 424,856

[22] Filed: Oct. 20, 1989

Related U.S. Application Data

[63] Continuation-in-part of Ser. No. 90,873, Aug. 31, 1987, abandoned.

[51] Int. Cl.$^5$ ............................................. G06F 11/28
[52] U.S. Cl. .................................. 371/60; 371/49.4
[58] Field of Search .................... 371/49.4, 51.1, 60

[56] References Cited

U.S. PATENT DOCUMENTS

| | | | |
|---|---|---|---|
| 3,192,362 | 6/1965 | Cheney | 364/738 X |
| 3,387,262 | 6/1968 | Ottaway et al. | 371/51 X |
| 3,518,413 | 6/1970 | Holtey | 371/16 |
| 4,019,033 | 4/1977 | Parmet | 371/51 |
| 4,074,229 | 2/1978 | Prey | 371/60 |
| 4,108,359 | 8/1978 | Proto | 371/25 |

FOREIGN PATENT DOCUMENTS 2346770 10/1977 France .
1038704 8/1966 United Kingdom .

OTHER PUBLICATIONS

IEEE Trans. On Computers, Cook et al., "Design of a Self-Checking Microprogram Control", vol. C-22, Mar. 1973, pp. 255-262.

Primary Examiner—Stephen M. Baker
Attorney, Agent, or Firm—Alfred W. Kozak; Mark T. Starr

[57] ABSTRACT

A control store holding a large number of instruction words is accessed by a sequence of instruction addresses. An intercooperating system uses a test condition select logic unit and a next address select logic unit are combined with address sequence error detection logic in order to develop an error flag signal should there be some error in the sequence of the actual instruction address data supplied to the control store.

2 Claims, 2 Drawing Sheets

ENHANCED ERROR DETECTION SCHEME FOR INSTRUCTION ADDRESS SEQUENCING OF CONTROL STORE STRUCTURE

This is a continuation-in-part of the patent application filed Aug. 31, 1987 as U.S. application Ser. No. 90,873, abandoned.

FIELD OF THE INVENTION

This disclosure is related to the field of computer circuitry where instructions are stored in a control store unit and error detection means are provided for verifying the sequence of instruction addresses.

BACKGROUND OF THE INVENTION

In present day computer circuitry, it is not uncommon to use a wide control store, for example, such as that having a magnitude of 32K words where each word has 200 bits and works in conjunction with a corresponding 200-bit output register (where K equals 1024). The control store will normally hold and carry instruction words to be used by the computer circuitry and the instruction words can be addressed by a sequence of "instruction address data" which will access the relevant instruction words.

When an error detection system is used for wide control stores, the most conventional system is a parity check of the instruction word by adding a parity bit into the instruction word residing in the control store.

These conventional parity error detection methods will cover only the errors caused by memory failures and those which cause the parity of the micro-instruction words to change. However, this type of error detection does not encompass any "instruction address" sequencing errors, since the erroneously accessed instruction would still show up as a valid parity value, since the word accessed was a valid word.

In the typical control store used in electronic circuitry, the instruction sequencing is done by generating the next instruction address through the use of the "next address field" of the present instruction as its "base data", which is under the control of the next address select control field of the present instruction word.

These next address select control fields of the presently existing instruction word can be designated as NAR (next address register) and as NASCR (next address select control register), and as CSR (condition select register).

The NASCR (next address select control register) field controls the selection of the next address from a number of different sources, depending upon which operation-sequence is to be performed.

The next address field, located in the next address register, NAR, may be used as the next instruction address without any changes in the case where the "unconditional" branch operation is being used. This next address may be generated by modifying a portion of the next address field by means of test conditions selected under control of the CSR field in the case of the "conditional" branch operations situation.

The next address (NA) may also be the "subroutine return address" (SRA) in the case of a return from a subroutine.

Or, the next address may be the "initial address" for the new operator, in the case situation where the circuit has finished execution of the current operator and is prepared to enter the new-operator execution routine.

Thus, since there are "multiple sources" of the next instruction address (NA) and since this is a variable and dynamic situation, there is normally no error protection mechanism to handle the situation when an address sequencing error occurs. Additionally it should be noted that the address sequencing error could then result in a very severe problem, such as data corruption, or by the execution of the wrong instruction in this particular case.

SUMMARY OF THE INVENTION

A control store holding a large number of instruction words is operated so that instruction words are accessed from the control store by means of a sequence of instruction addresses.

If there should be some error in the "address data" which accesses the instruction word, then the results could be catastrophic in that the wrong instruction would have been provided for the operating routine.

To obviate this type of problem condition, there is disclosed an enhanced error detection system for instruction address sequencing.

In this error detection system, a "parity relation" (PR) bit file is added to the control store and there is added an Address Sequence Error Detection Logic (ASEDL) unit which cooperates with the general control store structure to detect any instruction address sequencing errors. The PR bit is a programmed static information flag (PRF) which indicates the parity relation (for example, different or not) of the present instruction address and the next address field of that instruction word which is accessed by the present instruction address.

The ASEDL unit then tracks the parity relationship of the present instruction address and the possible next instruction address by means of an independent path and then generates what the selected next instruction address parity should be --- in relationship to the present instruction address parity.

When the actual next instruction address is selected and has then become the new present instruction address, the parity relationship, between the new present instruction address and the previous present-instruction-address, is generated in order to indicate the actual parity relation.

Then this actual instruction address parity relationship is compared against the "expected" instruction address parity relationship tracked by the separate path described above. If they do not agree, then there must have been an instruction address sequence error. The detected error condition is sent to a maintenance processor for reporting and possible error recovery action.

GLOSSARY FOR FIG. 1

PA : Present Address
PAR : Present Address Register
NA : Next Address (Base)
NAR : Next Address Register
NASCR : Next Address Select Control Register CSR: : Condition Select Register
CR : Command Register
PRF : Parity Relation Flag (Parity is different between PA and NA)
APIDIFF : Address Parity Is Different
SRA : Subroutine Return Address
ASEF : Address Sequence Error Flag

GLOSSARY FOR FIG. 2

PAR : Present Address Register
PA : Present Address
NA : Next Address
PR : Parity Relation (Parity is different between PA and NA)
NA[2:3] : Next Address Bits 0, 1, 2
APIDIFF : Address Parity Is Different
APSBDIFF : Address Parity Should Be Different
ASPE : Address Sequence Parity Error
ASPED : Address Sequence Parity Error Detected
ASPEF : Address Sequence Parity Error Flag
EASPED : Enable Address Sequence Parity Error Detection
PPAP : Previous Present Address Parity
NPAP : New Present Address Parity
SCP : Selected Condition Parity
NAFP : Next Address Field Parity
CPR : Change In Parity Relations
NPRC : New Parity Relation for Conditional Branch
PRU : Parity Relation for Unconditional Branch
PRC : Parity Relation for Conditional Branch

DESCRIPTION OF PREFERRED EMBODIMENT

Figure 1:
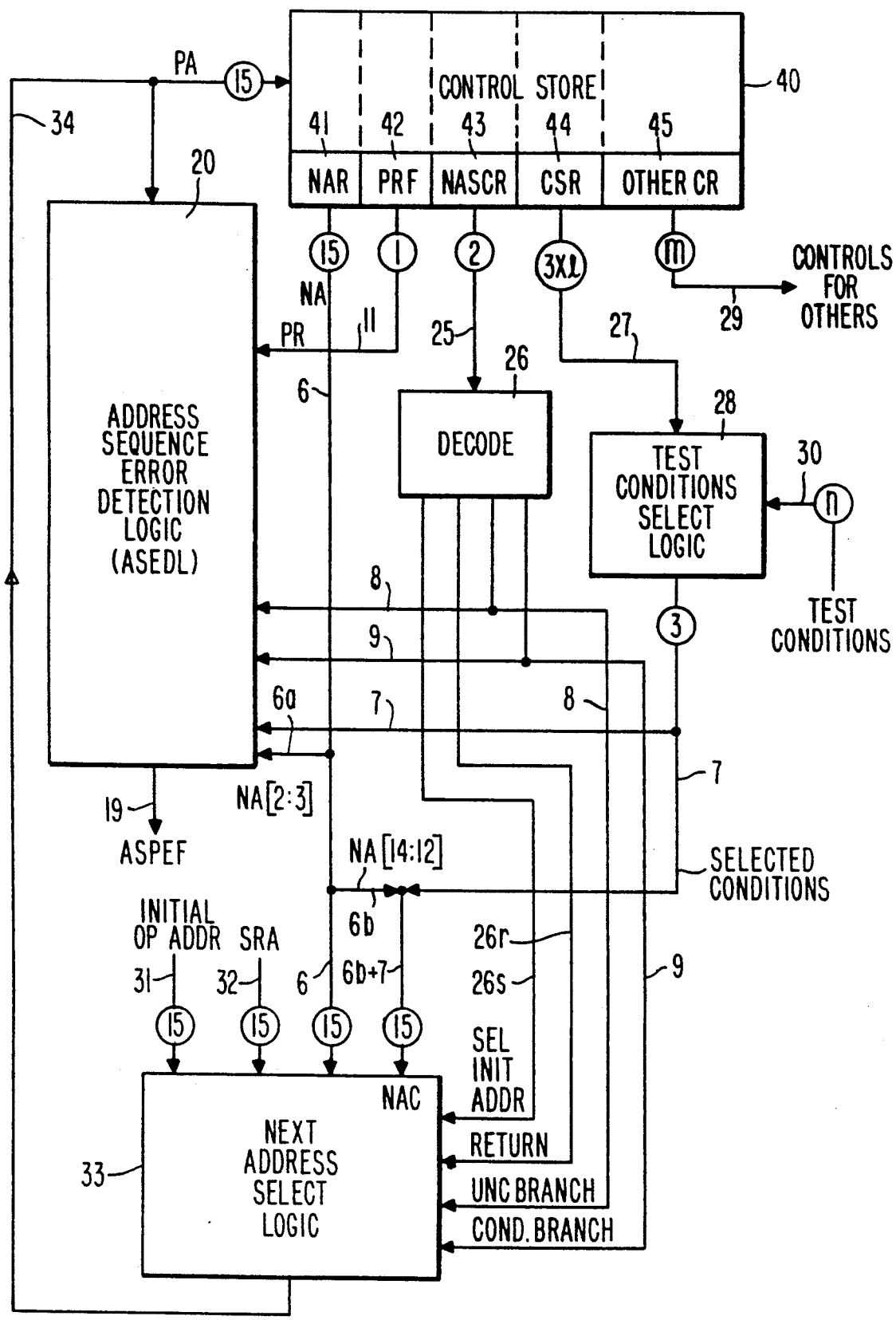
FIG. 1 is a block diagram of a system for incorporating address sequence error detection circuitry in conjunction with an instruction control store in order to detect any errors in the instruction address sequences.

With reference to FIG. 1, there is seen the enhanced error detection system for instruction address sequencing of a control store structure.

In FIG. 1, a control store 40, for example, may be a memory structure of 32K words where each word is composed of 200 bits and provided with a 200-bit output register which may be designated as the combination of 41, 42, 43, 44, and 45. The standard value of K is equal to 1024. This control store 40 is serviced by the test conditions select logic unit 28, the next address select logic unit 33, the decoder 26, and the address sequence error detection logic 20 (ASEDL) which can generate an error flag designated as ASPEF. This can be designated as the address sequence parity error flag on line 19.

The control store 40 has an output register comprised of a number of sections each having their own separate register. The NAR, next address register 41, occupies the first section followed by the PRF or parity relation flag 42, the NASCR or next address select control register 43, the condition select register 44 (CSR), and a series of other command registers designated CR 45.

The command registers 45 provide an m-bit wide output bus 29 to control other elements in the system such as the arithmetic logic unit of the data path and other elements.

As indicated hereinafter, the test conditions select logic 28 (FIG. 1) includes three multiplexors each of which receives "n" inputs of test condition signals. From these "n" inputs, the condition select register, CSR44 sends select signals (3 groups of "λ" lines) on bus 27 to select which three (out of n) test conditions will be passed via output line 7 (FIG. 1) to modify the next address being developed in the Next Address Select Logic 33 (FIG. 1).

The condition select register 44 (CSR) provides an output bus (three sets of λ lines each) set of which goes to a separate multiplexer unit; for example, if there are 16 test conditions, where n=16 is seen in FIG. 1, then each "set" will have four select lines, where "λ"=4) 27 over to the test condition select logic 28 to define which three line test conditions are to be selected for the conditional branch cases. For example, these three conditions might be: (i) operand one is an integer; (ii) operand two is an integer; and (iii) integer overflow condition.

The next address select control register 43 (NASCR) provides a 2bit bus output 25 to the decoder 26 to define what type of sequencing is to be carried out.

The parity relation flag 42 (PRF) has but one output line 11 labeled PR which is sent to the address sequence error detection logic unit 20 for error detection.

The next address register 41 (NAR) has a 15-bit wide output bus 6 which is connected to the next address select logic unit 33 for the unconditional branch case. The most significant 12-bit field, NA[14:12] designated 6b, is concatenated with the 3bit selected test conditions output bus 7 from the test condition select logic unit 28, in order to form the "next address for the conditional branch" case (NAC), designated 6b+7, and sent to the next address select logic unit 33. Additionally, the least significant 3-bit field 6a, NA[2:3], is sent to the address sequence error detection logic 20 for error detection.

The test conditions select logic unit 28 selects three conditions defined by the input lines 27 from the "n" test conditions input 30 that it receives from the various other parts of the system. Examples of these test conditions might be -- types of operands; results of the ALU operation; status of memory cycles; etc. These three selected conditions on bus 7 are sent to the address sequence error detection logic unit 20 for processing. Additionally, these three lines form a part of the next address for the conditional branch case, NAC, as previously described above.

The test conditions select logic 28 includes three multiplexors. Each multiplexor has 16 inputs (bus 30 of FIG. 1) from various test condition signals. Additionally each multiplexor has a set of "λ" input lines from the Condition Select Register 44 (FIG. 1). The "λ" inputs to the multiplexor are decoded in the multiplexor and then logically "AND"ed with the test condition signals to provide output to an OR gate which then provides an output bit for modification of the next address to be selected. Thus the three multiplexors provide three bits of modification data.

In FIG. 1, the decoder 26 decodes the two input lines 25 and generates four decoded lines which determine which sequencing operations are to be performed, such as: (i) select new initial instruction address for the next operator 26s; (ii) the subroutine return address 26r; (iii) the unconditional branch signal 8; and (iv) the conditional branch signal 9.

All of these four lines are sent to the next address select logic unit 33 for a proper selection of the next address. The unconditional branch signal 8 and the conditional branch 9 signal lines are also sent to the address sequence error detection logic unit 20 for error detection.

In FIG. 1, the next address select logic unit 33 selects the proper next address from the four possible next addresses based upon the control input lines from the decoder unit 26. The four possible next addresses are:

(a) initial operator address 31;
(b) the subroutine return address, SRA 32;

(c) the next address for the unconditional branch, NA 6;

(d) the next address for the conditional branch, NAC 6b+7.

The corresponding select control input lines from the decoder 26 can be indicated as follows:

(i) select new initial instruction address for the next operator, 26s;
(ii) subroutine return address 26r;
(iii) the unconditional branch 8;
(iv) the conditional branch line 9.

The selected next address becomes the new present address, PA, and is put upon the output bus 34. This 15-bit output bus, PA 34, is sent to the control store 40 to access the next instruction word. Additionally, the output bus PA 34 is conveyed to the address sequence error detection logic unit 20 for error detection.

The key functional unit for this invention is the address sequence error detection logic unit 20 which is further described in connection with FIG. 2.

Figure 2:
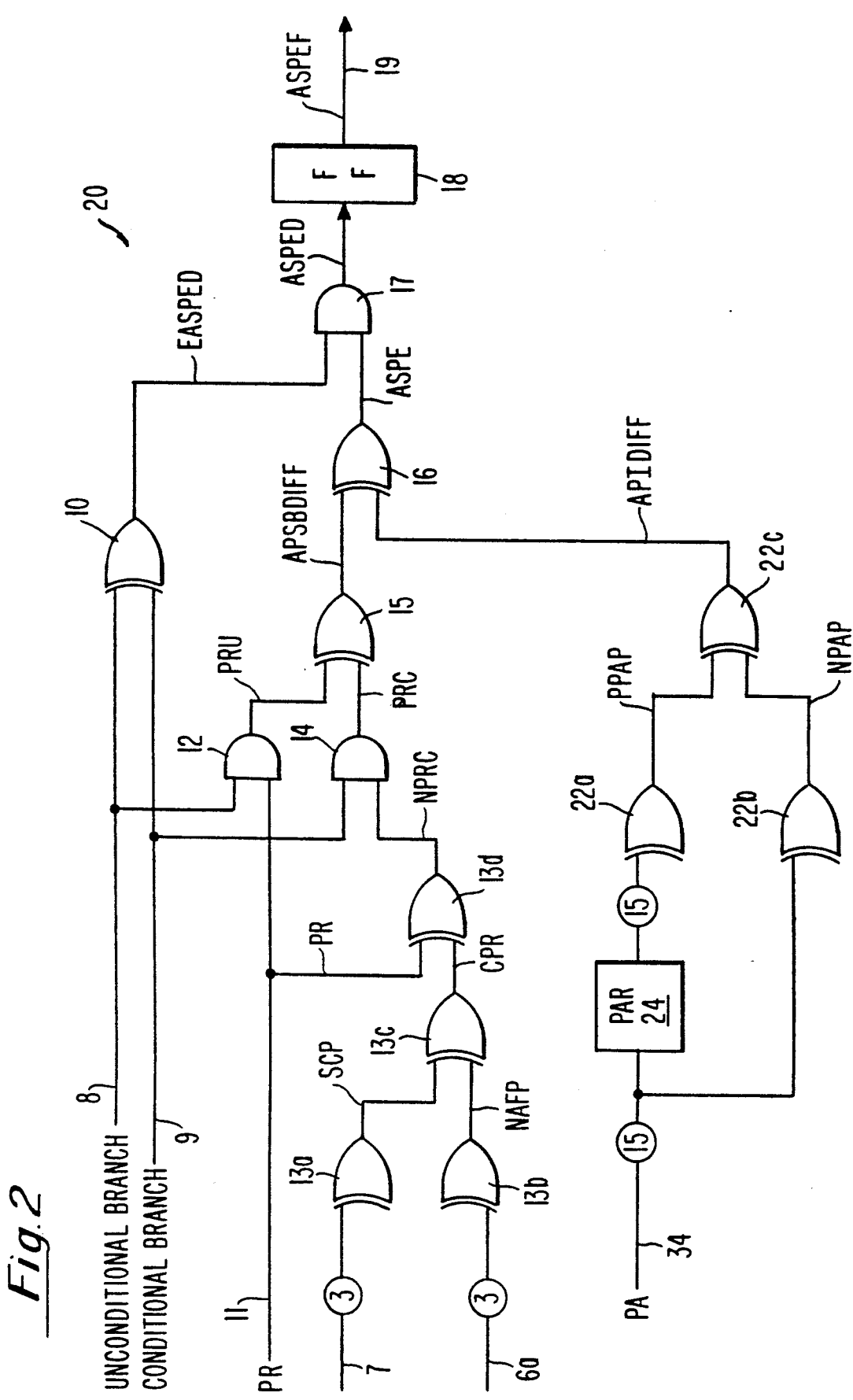
FIG. 2 is a diagram of the address sequence error detection logic used in conjunction with the instruction address control store circuitry.

Referring to FIG. 2, the input lines unconditional branch 8 and the conditional branch lines 9, from the decoder unit 26 of FIG. 1, are fed to the OR gate 10 to generate an output signal designated EASPED (enable address sequence parity error detection). This EASPED signal is then fed to one input leg of the two-legged AND gate 17 to enable the error detection only during the unconditional branch case and the conditional branch case.

For the unconditional branch case, and considering that the parity relation PR line 11 should not be altered for this situation, the unconditional branch 8 and the PR line 11 are fed into the AND gate 12 to produce the output signal PRU (parity relation for unconditional branch). This signal is then fed to one input leg of the two-legged OR gate 15.

In FIG. 2 for the "conditional" branch case, the parity relation is needful of being altered and requires tracking of the relationship. This function is performed by the exclusive OR gates 13a, 13b, and 13c, and 13d. Thus, the three selected condition lines 7 of FIG. 2 are fed into the exclusive OR gate 13a to generate the output signal SCP (selected condition parity). The SCP signal is then fed to one leg of the exclusive OR gate 13c. The next address field NA[2:3] 6a (FIG. 1) are fed into the exclusive OR gate 13b to generate the output signal NAFP (next address field parity).

The NAFP signal is then fed to the other leg of the exclusive OR gate 13c. Then the output of the exclusive OR gate 13c, which is designated CPR (change in parity relation), represents whether or not the parity relation is changed, or not, for the conditional branch case.

The signal CPR is then fed to one leg of the exclusive OR gate 13d. The original parity relation bit line PR 11 is fed into the other leg of the exclusive OR gate 13d.

The output signal of the exclusive OR gate 13d is labeled NPRC (new parity relation for conditional branch case) and this represents what the new parity relation should be for the conditional branch cases.

The NPRC signal and the conditional branch signal line 9 are fed to the AND gate 14 to produce the output signal designated PRC (parity relation for conditional branch). This PRC signal is then fed to the other leg of the OR gate 15.

Subsequently, the output signal of the OR gate 15, designated APSBDIFF (address parity should be different), represents that the parity relation should be "different" between the "present" address parity and the "next" address parity for both the unconditional and the conditional branch cases.

The input bus PA 34 (present address) coming from the next address select logic unit 33 (of FIG. 1) is fed into the register labeled PAR 24 (present address register, FIG. 2) and additionally is fed into the exclusive OR gate 22b. The output of the PAR 24 is fed into the exclusive OR gate 22a. Then the output of the exclusive OR gate 22a (labeled PPAP to designate previous present address parity) represents the parity of the previous present address and it is fed to one leg of the exclusive OR gate 22c.

The output signal of the exclusive OR gate 22b, labeled as NPAP to designate new present address parity, represents the parity of the "new" present address, and it is fed to the other leg of the exclusive OR gate 22c. The exclusive OR gate 22c functions as a comparator of the parities of the "previous present address" and of the "new present address" — and the output signal, labeled APIDIFF, represents the difference of these two parities, thus indicating that the address parity is different. Subsequently, this APIDIFF signal is fed to the other leg of the exclusive OR gate 16.

Then the exclusive OR gate 16 further functions as a comparator of the two input signals, ABSBDIFF and APIDIFF, and operates to produce the output signal designated ASPE (address sequence parity error) thus indicating that a parity error has been detected in the address sequencing, if the sequencing operation is an "unconditional" branch or is a "conditional" branch case.

Then the ASPE signal is fed to the other leg of the AND gate 17. The output signal of the AND gate 17 is labeled ASPED (address sequence parity error detected) which represents that a parity error has been detected in the address sequencing during the conditional or the unconditional branch case, and this output signal is fed to the flip-flop 18 for latching the error condition. The output signal of the flip-flop 18 is labeled ASPEF (address sequence parity error flag) 19 which is transmitted to the maintenance processor in order to report the error condition and institute a possible recovery action.

In order to more clearly illustrate the disclosure, the following two examples will refer to FIGS. 1 and 2.

The first example is to deal with the "unconditional" branch case and has the following situation:

At a given instant, the system has received state signals indicating that an "unconditional" branch sequencing should happen and goes to the address indicated by the NAR 41 of FIG. 1 as the next address.

PAR 24 of FIG. 2 has a binary value of "000001111100000" indicating the address of the control store word accessed and loaded into the registers 41-45.

NAR 41 of FIG. 1 has a binary value of "000001111100001."

PRF 42 of FIG. 1 should be a binary value of "1" since it is a programmed static information representing the parity relation (different=1) of the PAR and NAR which are different in this example.

NASCR 43 of FIG. 1 has an encoded value representing the "unconditional" branch operation.

CSR 44 of FIG. 1 has a binary value of all 0's since it is an unconditional branch case and it is not relevant for this example case.

Other CR 45 of FIG. 1 is not relevant to this disclosure.

For this first example, the test condition select logic 28 does not play any role since this is an unconditional branch case. The decoder 26 of FIG. 1 would decode the value of NASCR 43 of FIG. 1 and set the output signal 8 to "true" indicating the unconditional branch and decode all other lines to "false." Then the next address select logic 33 of FIG. 1 selects NA 6 of FIG. 1 and puts that information onto the output bus at PA 34 of FIG. 1.

Assuming here that an error exists in the next address select logic 33 of FIG. 1 which has changed the value of the output by one bit. That is, the output PA 34 should have been the same as NAR but differs by one bit due to an error; "100001111100001" instead of "000001111100001."

Now referring to FIG. 2, the output signal of the OR gate 10, EASPED, is "true" since the unconditional branch signal 8 is "true." The output signal of the AND gate 12, PRU, is "true" since the unconditional branch signal 8 is "true" and the PR 11 is also "true." Then the output signal of the OR gate 15 (APSBDIF) is also "true" indicating that the address parity should be different.

The output signal of the exclusive OR gate 22a, PPAP (previous present address parity), is "true" since the contents of the PAR 24 should be an "odd" parity. However, the output signal of the exclusive OR gate 22b, NPAP (new present address parity), should be "false" indicating "even" parity if there was no error on PA bus 34. But it is "true" due to the error on PA bus 34 indicating "odd" parity. Then the output signal of the exclusive OR gate 22c, APIDIFF, is "false" indicating that the address parity is "not different."

Thus, the output signal of the exclusive OR gate 16, ASPE, is "true" because the APSBDIFF is "true" whereas the APIDIFF is "false." Then the output signal of the AND gate 17 is "true" because both the input signals, EASPED and ASPE, are "true" indicating that the address sequencing parity error has been detected. This error condition is captured in the flip-flop 18 on the next clock and the output signal, ASPEF, is sent to the maintenance processor for reporting and a possible recovery action.

The second example is to deal with the "conditional" branch case and has the following situation:

At a given instant, the system of FIG. 1 has received state signals indicating that a "conditional" branch sequencing should happen and it goes to the address of NAC 6b+7, formed by the base field of NAR, NA[14:12] 6b of FIG. 1, concatenated with the three test conditions selected by lines 7 of FIG. 1, as the next address.

PAR 24 of FIG. 2 has a binary value of "000001111100000" indicating the address of the control store word accessed and loaded into the registers 41-45.

NAR 41 of FIG. 1 has a binary value of "000001111111000."

PRF 42 of FIG. 1 should be a binary value of "0" since it is a programmed static information representing the parity relation (different=1) of the PAR and NAR which are "equal" in this example.

NASCR 43 of FIG. 1 has an encoded value representing the "conditional" branch.

CSR 44 of FIG. 1 has a binary value of "0001,0011,1111" indicating the select three test conditions addressed by these three values from the 16 test conditions. Note that these fields could be much larger if there were lots more test conditions to choose from. For ease of explanation, these particulars are chosen for this example.

"Other CR" 45 of FIG. 1 is not immediately relevant to these operations but could be used to control other associated circuitry.

The test condition select logic unit 28 of FIG. 1 selects three test conditions defined by the CSR 44 of FIG. 1, and for this example, assuming those three conditions are: "operand 1 is an integer;" "operand 2 is an integer;" and "integer overflow," and furthermore, assuming all these selected conditions are "true" for this example.

Then the binary value of the selected condition lines 7 of FIG. 1 is "111" and the binary value of the NAC 6b+7 would be "000001111111111." The decoder 26 of FIG. 1 would decode the value of NASCR 43 of FIG. 1 and output signal 9 to "true" indicating "conditional" branch and all other lines to "false." Then the next address select logic 33 of FIG. 1 selects NAC 6b+7 of FIG. 1 and places that information onto the output bus at PA 34 of FIGS. 1, 2.

Assuming here that an error exists in the next address select logic 33 of FIG. 1 which has changed the value of its output by one bit, that is, the output PA 34 should have been the same as NAC but differs by one bit due to an error; "000001111111110" instead of "000001111111111."

Now referring to FIG. 2, the output signal of the OR gate 10, EASPED, is "true" since the "conditional" branch signal 9 is "true." The output signal of the exclusive OR gate 13a, SCP, is "true" indicating "odd" parity since all three input lines 7 are true ("111"). The output signal of the exclusive OR gate 13b, NAFP, is "false" indicating "even" parity since the input bus 6a NA[2:3] has a binary value of "000."

Then the output signal of the exclusive OR gate 13c, CPR, is "true" indicating the original parity relation has been changed. The output signal of the exclusive OR gate 13d, NPRC, becomes "true" since the PR line 11 is "false" because the PRF 42 is "false" whereas the CPR from gate 13c is "true."

Then the output signal of the AND gate 14, PRC, is "true" since the conditional branch 9 is "true" and the NPRC output is also "true." The output signal of the OR gate 15, APSBDIFF, is also "true" since the PRC is "true" indicating that the address parity should be different.

The output signal of the exclusive OR gate 22a, PPAP (previous present address parity), is "true" since the contents of the PAR 24 should be "odd" parity. However, the output signal of the exclusive OR gate 22b, NPAP, should be "false" indicating "even" parity if there was no 34 indicating "odd" parity. Then the output signal of the exclusive OR gate 22c, APIDIFF, is "false" indicating that the address parity is "not different." Thus the output signal of the exclusive OR gate 16, ASPE (address sequence parity error), is "true" because the APSBDIFF is "true" whereas the APIDIFF is "false." Then the output signal of the AND gate 17 is "true" because both the input signals, EASPED and ASPE, are "true" indicating that the address sequencing parity error has been detected. This error condition is captured in the flip-flop 18 on the next clock and the output signal, ASPEF 19, is sent to the maintenance processor for reporting and a possible recovery action.

As the above two examples have demonstrated, it is seen that the disclosed system detects address sequencing errors which would not have been detected in a conventional system and would have caused a severe system problem, such as data corruption, by execution of the wrong instruction.

It may be noted that the detection of an instruction address "sequencing error" is only possible when provision is made to have the parity relation of the "present instruction address" and the "next instruction address" for selective analysis. This involves the unconditional branch and the conditional branch sequence cases.

If the next instruction address sequencing is the SRA or subroutine return address, or if the next instruction address is the "initial instruction address for the new operator," then the parity relation between the "present" instruction address and these "next" instruction addresses are not determinable. However, these types of cases are of a most infrequent nature in comparison to the normally used situation of the unconditional and the conditional branch case routines. Thus, by not being able to detect any address sequence errors during the seldom used types of cases, this should not significantly reduce the effectiveness of the described instruction address sequence error detection system described herein.

Of course, there is a situation which could occur if the error situation occurred which does not change the parity relationship (such as certain types of multiple bit errors), then this condition will not be detected by the error detection system. But again, this would be a very insignificant number of cases in contrast with all the normal type of error situation cases and thus this does not significantly reduce the effectiveness of the disclosed instruction address sequence error detection system.

However, in spite of the above mentioned limitations which could occur because of seldom used routines, the system described herein quite markedly enhances the protection against the more normal type of instruction address sequencing errors which constitutes the bulk of the operations in the use of addressing instructions from a large control store.

There has been described herein a system whereby a large control store having instruction routines can be sequentially addressed in order to effectuate access to a sequence of instruction word routines from the control store, and yet providing for the handling of the sequential addresses (for accessing locations in the control store) in such a fashion that the parity relationships of the present address location compared with the parity of the next address location can be compared in order to detect whether or not there has been an error in the address sequencing operation. By thus detecting any such address sequencing errors, it is possible to better maintain the integrity of operation of the system and also recognize when an error has occurred which can then be indicated and later corrected.

While one preferred embodiment of the address sequence error detection system has been described, there may be other variations of such a system which similarly provide the same integrity-seeking function as defined in the following claims hereinbelow.

What is claimed is:

1. In a computer system's control store means having a plurality of instruction words which are accessed by instruction address data, wherein said control store means includes a next address register, a parity relation flag register, a next address select control register, and a condition select register, an apparatus for instruction error detection between sequences of instruction addresses, comprising:
   (a) control store means for storing a plurality of instruction words at a variety of addressable locations and wherein said control store means includes:
      (a1) a next address register (NAR) for holding the next instruction address for unconditional branch operations and for holding the base of the next instruction address for conditional branch operations;
      (a2) a parity relation flag register (PRF) for holding the programmed parity relation bit which represents the relationship of the present instruction address and the next address field of the instruction word being addressed by the present instruction address;
      (a3) a next address select control register (NASCR) for holding the encoded control data designing what type of sequencing is to take place for the next address election as to whether this will be an initial address, a return address, an unconditional branch address, or a conditional branch address;
      (a4) a condition select register (CSR) for holding a plurality of select control signals for a test conditions select logic means in order to select the desired test conditions received from signals derived from other sections of the computer system in order to provide modification signals which will select the next instruction address data;
   (b) next address select logic means (NASL), connected to provide output signals to said next address register, and connected to receive signals from a decoder means and from said test conditions select logic means for developing the next instruction address based upon the next address field of the prior instruction word;
   (c) said test conditions select logic means functioning to sample selected test conditions during conditional branching and for providing said modification signals toward modifying the next instruction address, and wherein said test conditions select logic means is connected to receive signals from said condition select register (CSR) and to provide said modification signals, reflective of selected test conditions, said modification signals being conveyed to an address sequence error detection logic means (ASEDL) and also to said next address select logic means (NASL);
   (d) said address sequence error detection logic means (ASEDL) connected to receive signals from said test conditions select logic means and from said decoder means in order to generate an error flag signal when a parity error is detected in the consecutive instruction addresses applied to the said controls tore means, and wherein said address sequence error detection logic means (ASEDL) is connected to receive information signals from said parity relation flag register (PRF) and from said decoder means and is further connected to receive information data from said next address select logic means (NASL);
   (e) said decoder means connected to receive output signals from said next address select control register (NASCR) for generating selection signals as to the type of next instruction address to be selected, said decoder means providing output signals to said address sequence error detection logic means (ASEDL) and said next address select logic means.

2. The apparatus of claim 1 wherein said address sequence error detection logic means (ASEDL) includes:

(a) means to determine whether the parity value of the present instruction address and the next instruction address should be different or should be the same;

(b) means to determine whether the parity value between said present instruction address and said next instruction address is actually different or is the same;

(c) means to compare the "should be" parity value with the "is" parity value in order to generate a signal which indicates whether or not an instruction address sequencing error has occurred.

* * * * *